US012145286B2

(12) United States Patent
Griffin et al.

(10) Patent No.: US 12,145,286 B2
(45) Date of Patent: Nov. 19, 2024

(54) RAZOR CARTRIDGES

(71) Applicant: SL SHAVECO LLC, Beverly, MA (US)

(72) Inventors: John W. Griffin, Moultonborough, NH (US); William E. Tucker, Plymouth, MA (US); Craig A. Provost, Newport Beach, CA (US); Douglas R. Kohring, Arrowsic, ME (US)

(73) Assignee: SL SHAVECO LLC, Beverly, MA (US)

( * ) Notice: Subject to any disclaimer, the term of this patent is extended or adjusted under 35 U.S.C. 154(b) by 0 days.

(21) Appl. No.: 18/319,313

(22) Filed: May 17, 2023

(65) Prior Publication Data

US 2024/0083047 A1 Mar. 14, 2024

Related U.S. Application Data

(63) Continuation of application No. 17/247,712, filed on Dec. 21, 2020, now abandoned, which is a continuation of application No. 15/324,245, filed as application No. PCT/US2015/038543 on Jun. 30, 2015, now Pat. No. 10,960,558.

(60) Provisional application No. 62/023,419, filed on Jul. 11, 2014.

(51) Int. Cl.

| | |
|---|---|
| ***B26B 21/40*** | (2006.01) |
| ***B26B 21/22*** | (2006.01) |
| ***B26B 21/56*** | (2006.01) |

(52) U.S. Cl.

CPC ........ *B26B 21/4031* (2013.01); *B26B 21/222* (2013.01); *B26B 21/4012* (2013.01); *B26B 21/4018* (2013.01); *B26B 21/565* (2013.01)

(58) Field of Classification Search

CPC ................ B26D 21/40; B26D 21/4006; B26D 21/4012; B26D 21/4018; B26D 21/4025; B26D 21/4031; B26D 21/14; B26D 21/20; B26D 21/222; B26D 21/225; B26D 21/227; B26D 21/54–565

USPC ........................................................ 30/47–51

See application file for complete search history.

(56) References Cited

U.S. PATENT DOCUMENTS

| | | | |
|---|---|---|---|
| 3,871,073 | A | 3/1975 | Nissen et al. |
| 4,270,268 | A | 6/1981 | Jacobson |
| 4,345,374 | A | 8/1982 | Jacobson |
| 4,403,412 | A | 9/1983 | Trotta |
| 4,516,320 | A | 5/1985 | Peleckis |
| 4,621,424 | A | 11/1986 | Jacobson |

(Continued)

FOREIGN PATENT DOCUMENTS

| | | |
|---|---|---|
| KR | 20130125538 | 11/2013 |
| WO | 2013168894 | 11/2013 |

OTHER PUBLICATIONS

International Application No. PCT/US2015/038543, International Search Report and Written Opinion dated Oct. 6, 2015, 9 pages.

*Primary Examiner* — Adam J Eiseman
*Assistant Examiner* — Richard D Crosby, Jr.
(74) *Attorney, Agent, or Firm* — Leber IP Law; Celia H. Leber

(57) ABSTRACT

Replaceable shaving assemblies are disclosed that include a razor cartridge having a blade geometry that is designed to provide a close, comfortable shave. Shaving systems including such shaving assemblies are also disclosed, as are methods of using such shaving systems and methods of manufacturing these cartridges.

25 Claims, 7 Drawing Sheets

(56) References Cited

U.S. PATENT DOCUMENTS

| | | | |
|---|---|---|---|
| 4,854,043 | A | 8/1989 | Chen |
| 5,063,667 | A | 11/1991 | Jacobson |
| 5,092,042 | A | 3/1992 | Miller et al. |
| 5,224,267 | A | 7/1993 | Simms et al. |
| 5,369,885 | A | 12/1994 | Ferraro |
| 5,813,293 | A | 9/1998 | Apprille, Jr. et al. |
| 6,161,288 | A | 12/2000 | Andrews |
| 6,185,822 | B1 | 2/2001 | Tseng et al. |
| 6,216,349 | B1 | 4/2001 | Gilder et al. |
| 6,295,734 | B1 | 10/2001 | Gilder et al. |
| 6,651,342 | B1 | 11/2003 | Walker, Jr. |
| D514,253 | S | 1/2006 | Gray |
| 7,131,202 | B2 | 11/2006 | Pennell et al. |
| 7,200,937 | B2 | 4/2007 | Richard et al. |
| 7,210,229 | B2 | 5/2007 | Coffin |
| 7,322,109 | B2 | 1/2008 | Newkirk et al. |
| 7,448,135 | B2 | 11/2008 | Zhuk et al. |
| 8,061,039 | B2 | 11/2011 | Kwiecien et al. |
| 8,209,869 | B2 | 7/2012 | Royle |
| 8,273,205 | B2 | 9/2012 | Murgida et al. |
| 8,336,212 | B2 | 12/2012 | Bozikis et al. |
| 8,448,339 | B2 | 5/2013 | Walker, Jr. et al. |
| 8,782,903 | B2 | 7/2014 | Clark et al. |
| D731,708 | S | 6/2015 | Tucker et al. |
| 9,308,657 | B2 | 4/2016 | Bruno |
| D764,100 | S | 8/2016 | Park et al. |
| 9,475,201 | B2 | 10/2016 | Georgakis et al. |
| D776,875 | S | 1/2017 | Ren et al. |
| 9,718,200 | B2 | 8/2017 | Dryfhout |
| 11,059,193 | B2 | 7/2021 | Bozikis |
| 11,059,195 | B2 | 7/2021 | Nicholas |
| 11,077,570 | B2 | 8/2021 | Dryfhout |
| 2002/0157259 | A1 | 10/2002 | Coffin |
| 2004/0134072 | A1 | 7/2004 | Walker et al. |
| 2005/0015991 | A1 * | 1/2005 | Follo .................. B26B 21/4031 30/50 |
| 2005/0198840 | A1 | 9/2005 | Worrick et al. |
| 2006/0277759 | A1 | 12/2006 | Follo |
| 2008/0256803 | A1 | 10/2008 | Tucker et al. |
| 2009/0083982 | A1 | 4/2009 | Forsdike |
| 2011/0146079 | A1 * | 6/2011 | Clarke .................. B26B 21/443 30/34.05 |
| 2011/0162208 | A1 | 7/2011 | Wain |
| 2011/0232100 | A1 | 9/2011 | Park et al. |
| 2012/0210586 | A1 | 8/2012 | Lelieveld et al. |
| 2012/0317818 | A1 | 12/2012 | Oglesby et al. |
| 2013/0081291 | A1 | 4/2013 | Wain et al. |
| 2013/0160305 | A1 | 6/2013 | Howell et al. |
| 2013/0160306 | A1 | 6/2013 | Howell et al. |
| 2013/0160307 | A1 * | 6/2013 | Howell ................. B26B 21/222 30/532 |
| 2015/0013169 | A1 | 1/2015 | Warrick |
| 2015/0090085 | A1 | 4/2015 | Griffin et al. |
| 2015/0101195 | A1 | 4/2015 | Long et al. |
| 2016/0167242 | A1 | 6/2016 | Noh et al. |
| 2017/0203451 | A1 | 7/2017 | Griffin et al. |

* cited by examiner

RAZOR CARTRIDGES

RELATED APPLICATIONS

This application is a continuation of U.S. patent application Ser. No. 17/247,712, filed Dec. 21, 2020, which is a continuation of U.S. patent application Ser. No. 15/324,245, filed Jan. 5, 2017, issued on Mar. 30, 2021, as U.S. Pat. No. 10,960,558 which is a U.S. national phase application of PCT Application Ser. No. PCT/US2015/38543, filed Jun. 30, 2015, which claims the benefit of U.S. Provisional Application Ser. No. 62/023,419, filed Jul. 11, 2014, the entire contents of which are hereby incorporated by reference.

BACKGROUND

Shaving systems often consist of a handle and a cartridge in which one or more blades are mounted in a plastic housing. In some cases, the blades are held in place in the housing by a pair of metallic clips, mounted at opposite ends of the length of the blades.

Most modern razor cartridges include one to five razor blades disposed between a guard and a cap. The cutting edge of each razor blade is positioned adjacent a plane that tangentially intersects the contact surfaces of the guard and the cap. This plane, referred to as the "contact plane," represents the theoretical position of the surface being shaved. The position of a razor blade's cutting edge relative to the contact plane is described in terms of the "exposure" of the cutting edge. A cutting edge with "positive exposure" is one that extends through the contact plane and into the area normally occupied by the object being shaved. A cutting edge with "negative exposure" is one that is positioned below the plane and therefore does not intersect the contact plane. A cutting edge with "neutral exposure" is one that is contiguous with the contact plane. Generally, positioning the cutting edge of a blade at a positive exposure has been found to improve closeness, but potentially also increases the chance of skin irritation. On the other hand, neutral or negative blade exposure tends to reduce the likelihood of irritation, but also tends to decrease the closeness of the shave.

The overall blade geometry of the cartridge, including blade exposure and other factors such as blade span, affects the comfort and closeness of the shave obtained with the razor, as well as the likelihood of nicks and cuts during shaving. As will be discussed further below, comfort and closeness is also impacted by "skin management," i.e., the way in which the skin bulge contacted by the blade edges is affected by other elements of the razor, including the guard that is provided at the leading edge of most razor cartridges.

SUMMARY

In general, the present disclosure pertains to razor cartridges (also known as blade units), and to shaving assemblies that include such cartridges.

In one aspect, the invention features a razor cartridge comprising (a) a frame defining a base, said frame having an opening defined in part by a composite guard having a leading guard surface and a cap having a trailing cap surface, said leading guard surface and said trailing cap surface cooperating to define a contact plane tangential thereto and extending across said opening; and (b) at least three razor blades attached to said base, said razor blades being fixedly spaced. The cutting edge of the razor blade closest to the leading guard surface has a cutting edge exposure relative to said contact plane that is positive, and the cutting edge exposures of the other razor blades become less positive from said leading guard surface to said cap.

By "composite guard," we mean a guard that includes a flexible elastomeric portion and a rigid or semi-rigid supporting portion that is closer to the blades than the flexible elastomeric portion and that is the last skin-engaging surface prior to the blades.

Some implementations include one or more of the following features.

The razor cartridge may include four or more blades, e.g., five blades.

The composite guard may include an elastomeric guard bar having a skin contacting surface, and a rigid guard bar support defining said leading guard surface, wherein the rigid guard bar support is proximal to the cutting edge of the razor blade closest to the leading guard surface. In some cases, the skin contacting surface of the elastomeric guard bar is higher than an uppermost surface of the rigid guard bar support, e.g., by about 0.05 to 0.5 mm, preferably by about 0.2 to 0.3 mm.

In some implementations, the cartridge has a pivot point that is closer to the trailing cap surface than to the leading guard surface. The pivot point may be below a lowermost portion of the blades.

In preferred implementations, the blades are spaced relatively close together. At least two of the blades may have an inter-blade span that is less than about 0.9 mm, e.g., from about 0.75 to 0.85 mm. The primary span, i.e., the distance between a leading edge of the leading guard surface and the cutting edge closest to the leading guard surface may be from about 0.3 to 0.75 mm, e.g., from about 0.35 to 0.45 mm.

In some implementations, the blades are bent blades, and the blades are fixedly supported within the frame such that the blades are not intended to move relative to the frame during shaving.

In another aspect, the invention features a razor cartridge comprising (a) a frame defining a base, said frame having an opening defined in part by a guard having a leading guard surface and a cap having a trailing cap surface, said leading guard surface and said trailing cap surface cooperating to define a contact plane tangential thereto and extending across said opening; and (b) at least three razor blades attached to said base, said razor blades being fixedly spaced. The cutting edge of the razor blade closest to the leading guard surface has a cutting edge exposure relative to said contact plane that is positive, the cutting edge exposure of the cutting edges of the other razor blades become less positive from said leading guard surface to said cap, and one or more of the blades has a cutting edge exposure that is negative or neutral.

In some implementations, razor cartridges according to this aspect of the invention may include any one or more of the features disclosed above.

In other aspects, the invention features methods of contacting the skin with the razor cartridges described herein, and methods of manufacturing razor cartridges.

DETAILED DESCRIPTION

Figure 1:
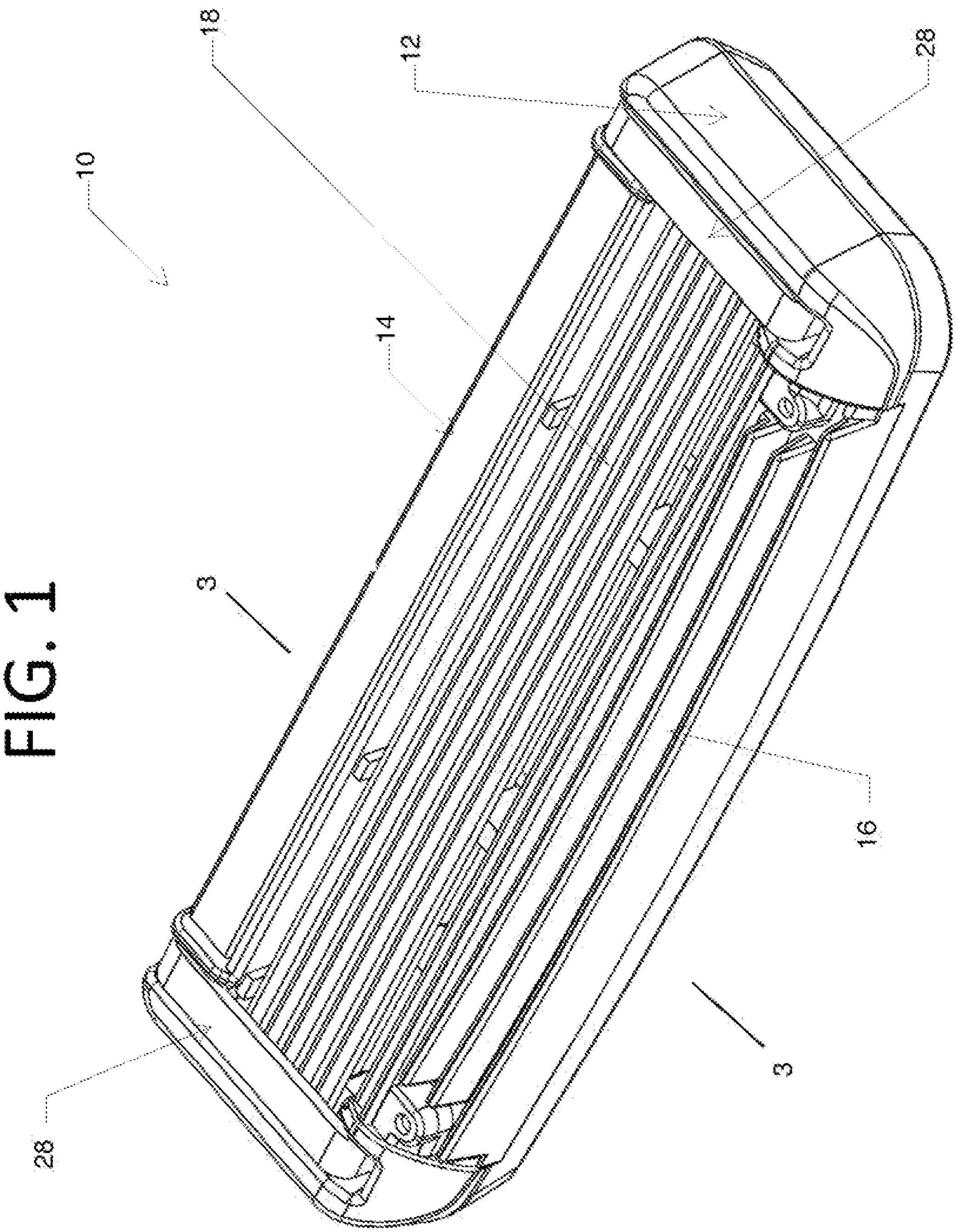
FIG. 1 is a perspective view of a razor cartridge according to one implementation.
Figure 2:
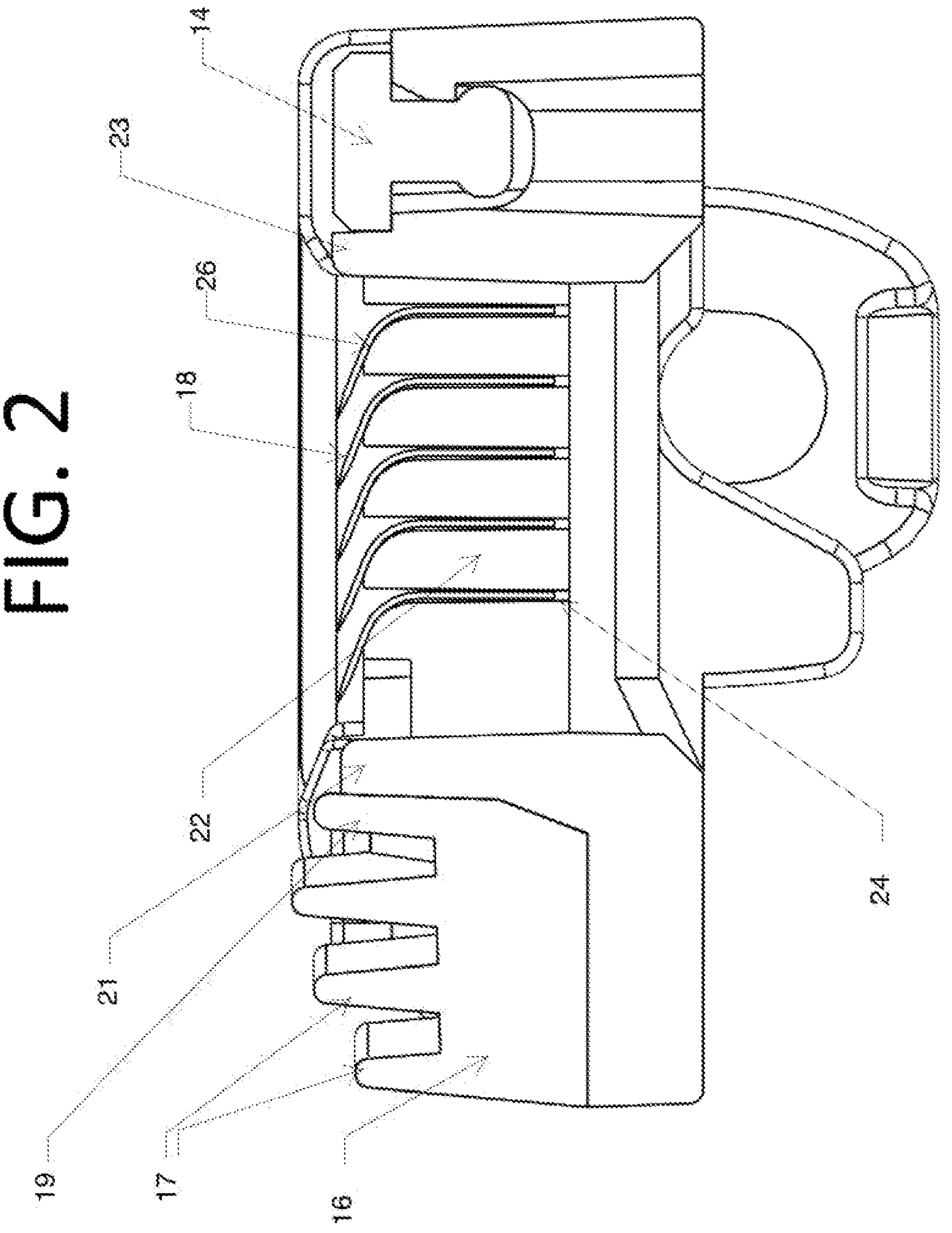
FIG. 2 is a cross sectional view of the razor cartridge shown in FIG. 1, taken along line 2-2 in FIG. 4.
Figure 5:
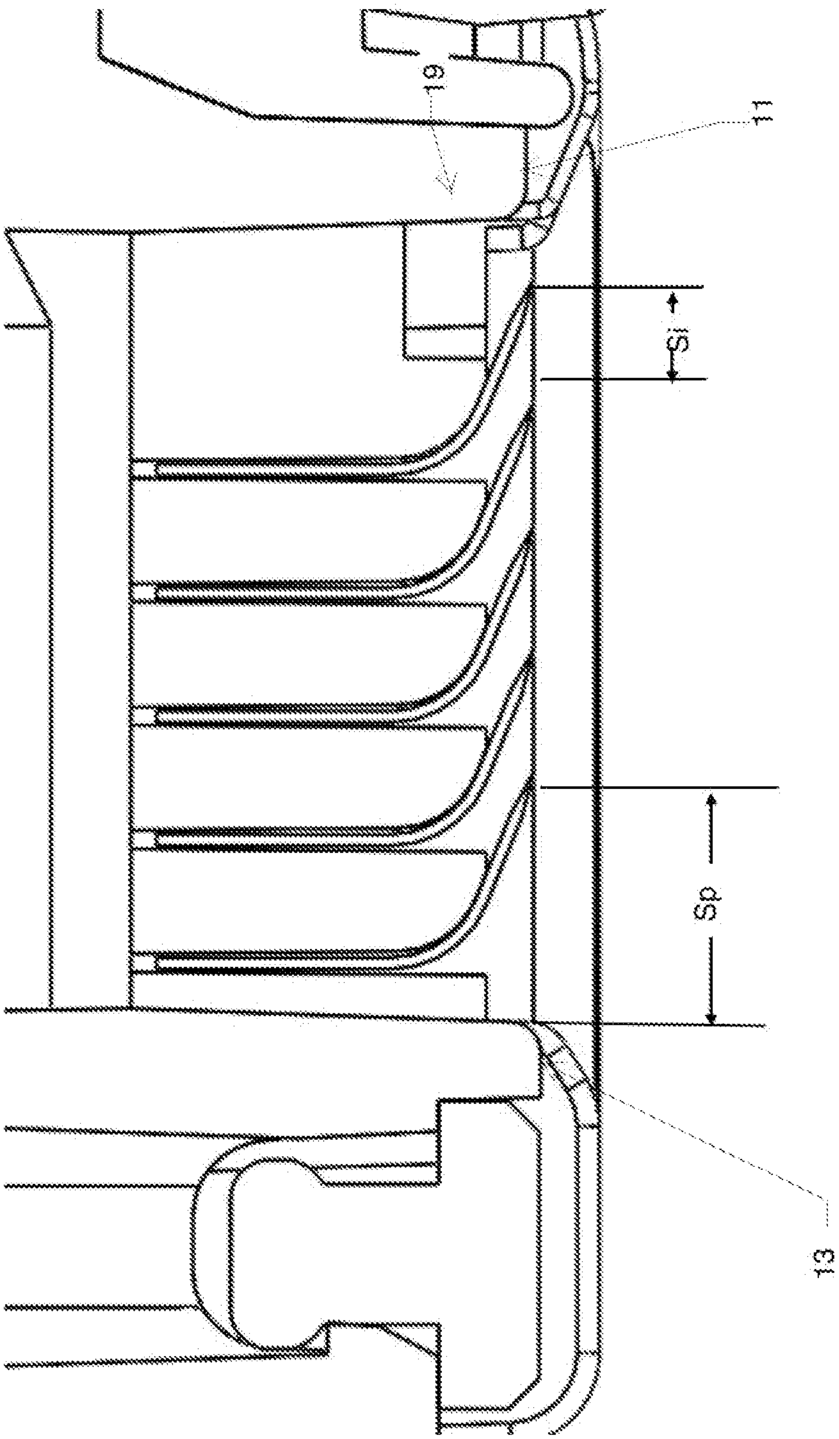
FIG. 5 is a diagrammatic cross-sectional view of a portion of the razor cartridge, showing features of the blade geometry of the cartridge.

FIG. 1 shows a razor cartridge 10 that includes a housing 12, a cap 14, a composite guard 16, and a plurality of blades 18 disposed between the cap and guard. In some implementations, the cap 14 may be formed of a rigid plastic. The housing 12 defines a generally rectangular frame surrounding an open area in which the blades are positioned. As shown in FIGS. 2 and 5, the housing also defines a rigid guard bar support 21 having a leading guard surface 11 (FIG. 5), and a rigid cap support 23 having a trailing cap surface 13 (FIG. 5.) As will be discussed in detail below, the razor cartridge 10 includes a number of features that contribute to enhanced skin management and thus to a close, comfortable shave.

Figure 3:
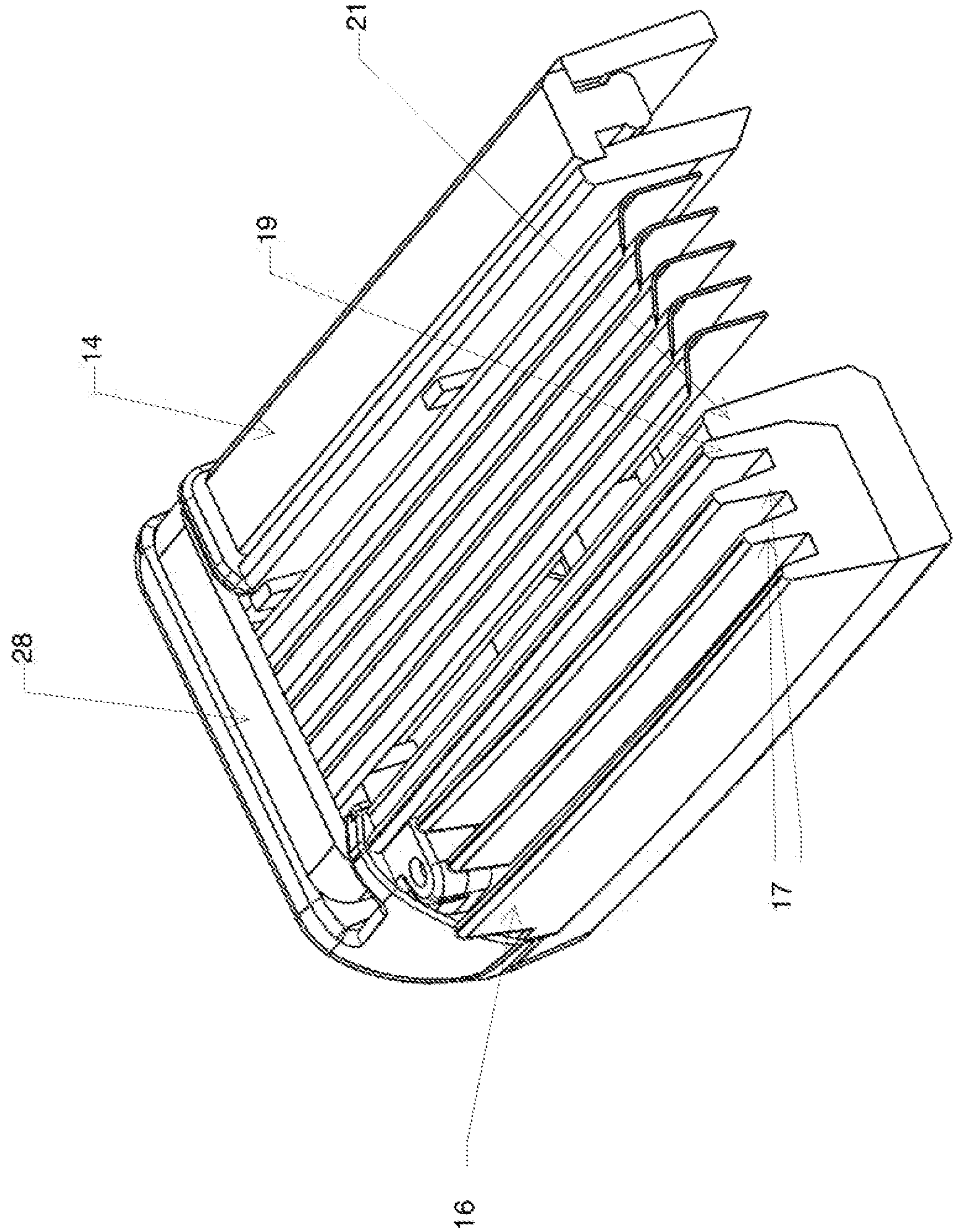
FIG. 3 is a cut-away perspective view of the razor cartridge shown in FIG. 1, cut along line 3-3 in FIG. 1.

Referring to FIGS. 2-3, the composite guard 16 includes an elastomeric portion having a plurality of fins 17 and an elastomeric guard bar 19, and a rigid portion provided by the rigid guard bar support 21. The elastomeric guard bar 19 is supported by the rigid guard bar support 21, which prevents excessive deflection of the elastomeric guard bar as the elastomeric guard bar stretches the user's skin during shaving. The elastomeric guard bar uniformly stretches, tensions, straightens and flattens the skin prior to the skin contacting the rigid guard bar support. The rigid guard bar support 21 is the last point of skin contact before the blades. Such composite guards are described in further detail in U.S. Application No. 61/983,790, filed Apr. 24, 2014, the full disclosure of which is incorporated herein by reference.

The elastomeric guard bar 19 is higher than the guard bar support 21, and is also higher than the cutting edge of the blade that is closest to the guard bar support (hereafter referred to as the "primary blade.") In some preferred implementations, the skin contacting surface of the elastomeric guard bar is higher than an uppermost surface of the rigid guard bar support by at least 0.05 mm, e.g., from about 0.05 to 0.5 mm or in some cases from about 0.2 to 0.3 mm higher. This height allows the elastomeric guard bar to stretch the skin prior to the skin contacting the primary blade, thereby managing the skin bulge and reducing the tendency of the primary blade to nick the skin. The rigid guard bar support then supports and manages the skin again prior to contact between the skin and the primary blade, setting the skin up for blade contact.

Figure 4:
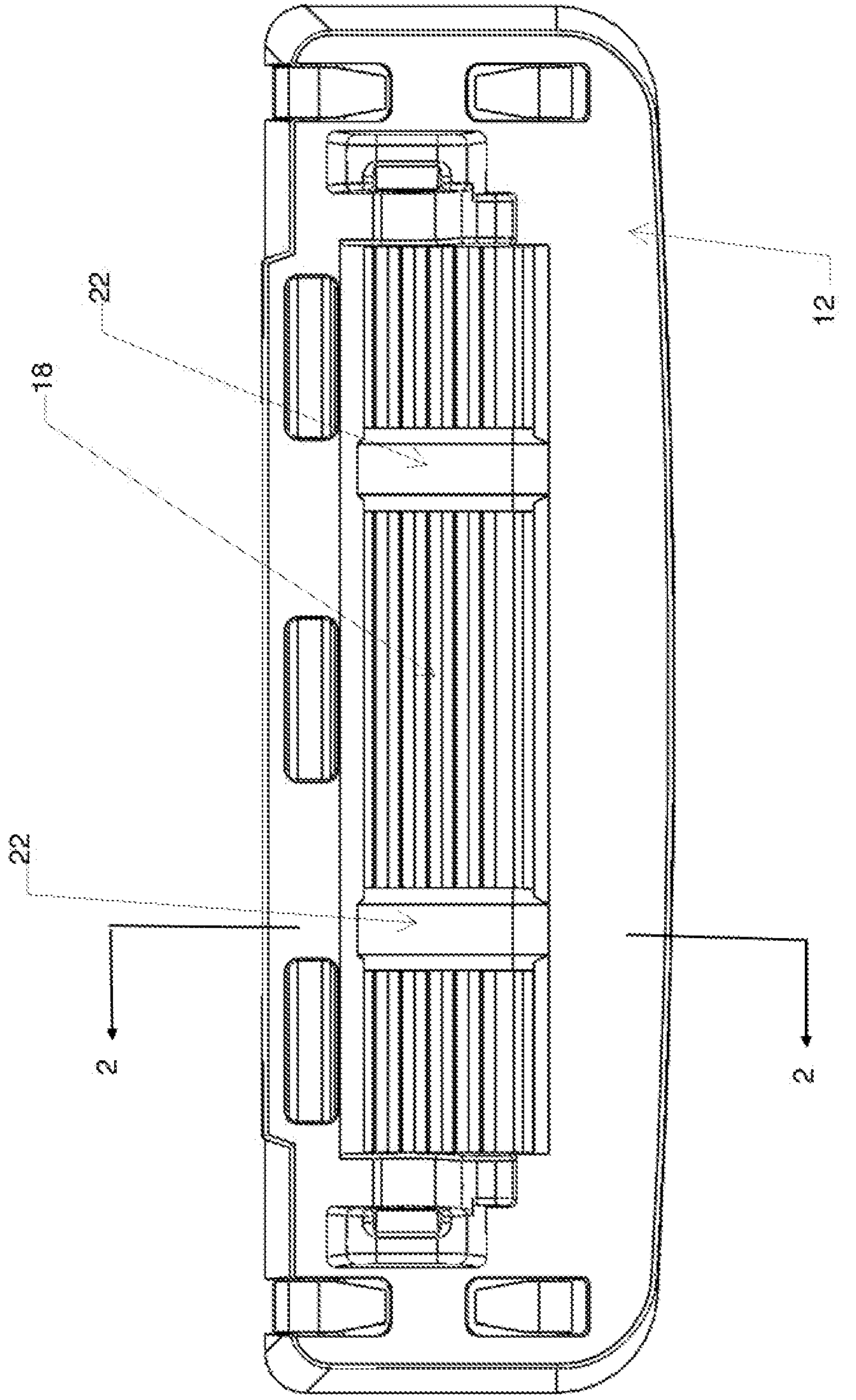
FIG. 4 is a rear plan view of the razor cartridge.

Blades 18 are positioned relative to each other and relative to the cutting plane discussed in the Background section above (plane $P_c$ in FIG. 5A, defined herein between the leading surface 11 of the guard bar support 21 and the trailing surface 13 of the cap support 23) by blade positioning elements 22 (FIG. 2). As shown in FIG. 4, the blade positioning elements are positioned at intervals along the length of the blades, providing open areas 20 between the blade positioning elements for rinse through of hair and debris. Together, the blade positioning elements provide a base for the blades.

Referring to FIG. 2, each of the blade positioning elements 22 defines a plurality of slots 24 which hold the blades in predefined positions relative to each other, while the curved upper surfaces 26 of the positioning elements 22 support the lower surfaces of the upper portions of the blades to maintain the blades in a predefined shaving geometry. The blades are preferably fixed blades, i.e., they are positioned by the positioning elements 22 in a manner that is intended to substantially prevent deflection of the blades during shaving.

Referring to FIG. 1, a pair of clips 28, disposed just inboard of the short ends of the housing 12, retain the blades securely in the housing. The clips may be arranged, for example, as disclosed in U.S. Application No. 61/885,906, filed Oct. 2, 2013, the full disclosure of which is incorporated herein by reference.

Blades 18 are preferably bent blades, as shown in FIGS. 2-3 and 5-6. By "bent blades," we mean blades that include an elongated blade portion that tapers to a cutting edge, an elongated base portion that is integral with the blade portion, and a bent portion, intermediate the blade portion and the base portion. Such blades are described, for example, in U.S. Pat. No. 5,010,646, the full disclosure of which is incorporated herein by reference.

It is also preferred that the blades be fixed blades, rather than "sprung" blades (e.g., blades of the type described in U.S. Pat. No. 4,270,268.) Thus, the blades are positioned by their placement in the slots of the blade positioning elements and held in place by the clips such that their position relative to the housing does not change during shaving.

The distance between the cutting edges of adjacent blades, referred to herein as inter-blade span ($S_i$, FIG. 5), is selected to enhance skin management, by managing the skin bulge as the cutting surface moves across the user's skin. The distance between each of the blade edges is preferably less than 0.9 mm, e.g., from about 0.75 to 0.85 mm.

The primary span ($S_p$, FIG. 5), i.e., the distance from the leading edge of the guard to the cutting edge of the primary blade, is also important to effective skin management. This distance, along with the relative heights of the elastomeric guard bar, guard bar support, and cutting edge of the primary blade, affects the balance between shaving comfort and closeness. The primary span is preferably from about 0.3 to 0.75 mm, more preferably from about 0.35 to 0.45 mm. Too small a distance tends to impact shaving closeness detrimentally, while too large a distance could cause the skin bulge to be too large, tending to result in nicking or skin irritation.

Figure 5A:
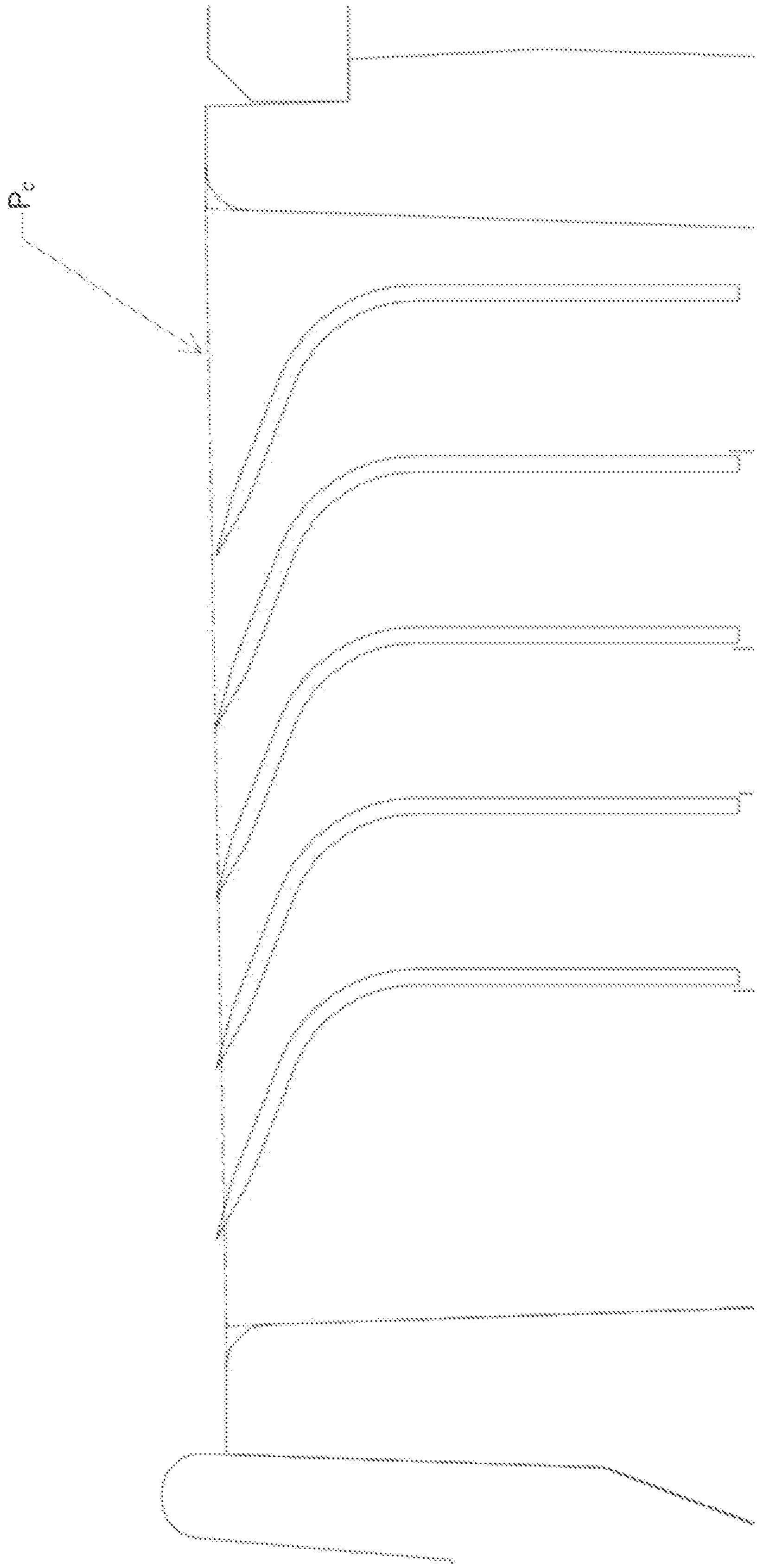
FIG. 5A is an enlarged diagrammatic view showing details of the blade geometry.

The skin management provided by the features discussed above contributes to the ability to have a primary blade with a positive exposure relative to the cutting plane without compromising user comfort. Preferably, the primary blade is positive by at least 0.02 mm, preferably by at least 0.025, e.g., at least 0.035 mm, and in some cases by about 0.04 mm or more. In some implementations, the primary blade could be positive by as much as 0.1 mm. As shown in FIG. 5A, the remaining blades have a less positive exposure as the blades become closer to the cap, with the blades closest to the cap having a negative exposure. In some cases, the second blade (counting from the primary blade towards the cap) has a neutral or slightly positive exposure, the third blade has a neutral exposure, and the fourth and fifth blades have a negative exposure.

The cartridge is designed to pivot in a manner that takes advantage of this blade exposure arrangement by causing shaving forces to be relatively evenly distributed over the blades during shaving, with somewhat less force being applied to the primary blade. By applying more force to the negative and neutral blades and less to the primary blade, shaving comfort is enhanced without deleteriously affecting closeness.

Figure 6:
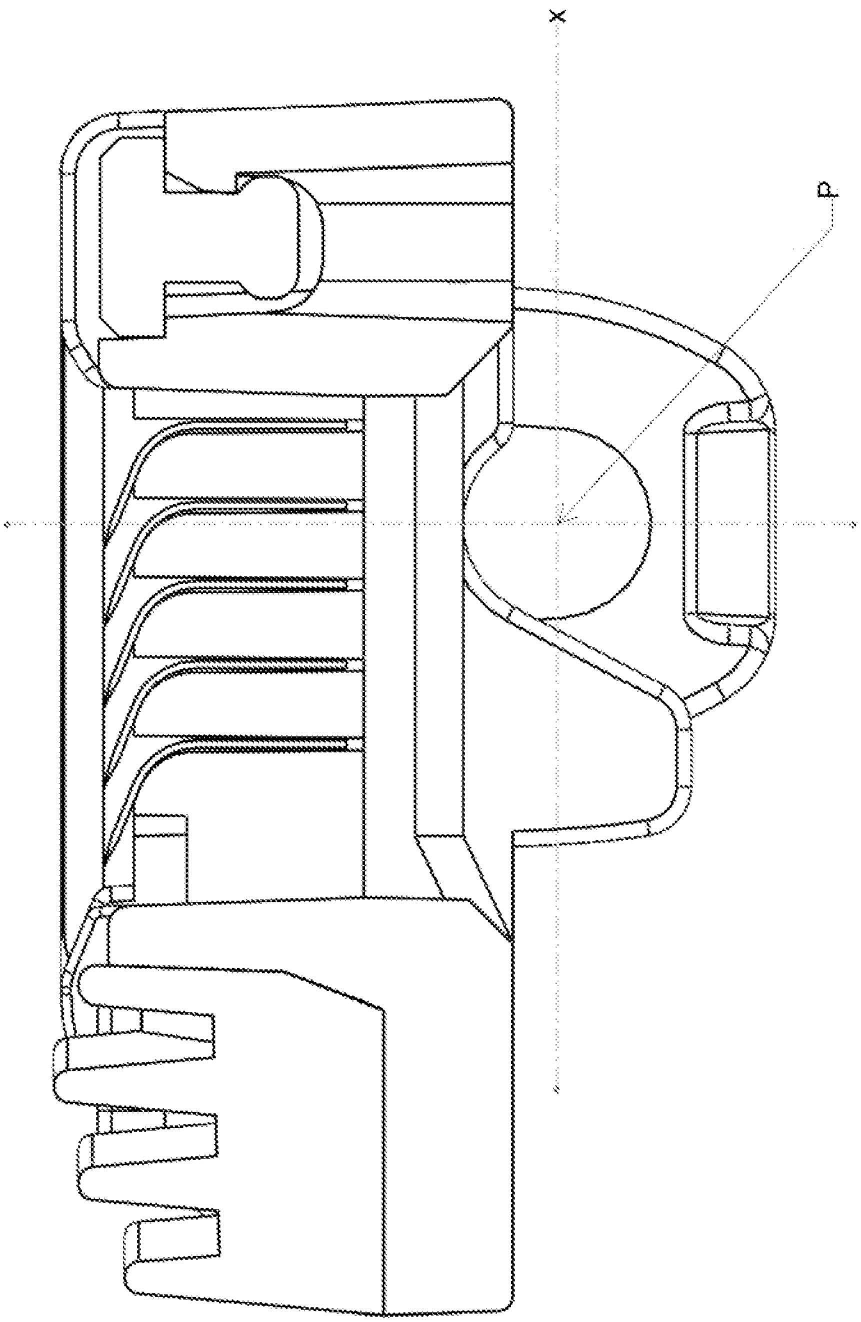
FIG. 6 is a cross-sectional view of the cartridge with the cartridge pivot point indicated.

Referring to FIG. 6, in preferred implementations the pivot axis P of the cartridge is positioned closer to the cap trailing edge than to the guard leading edge, measured along the x axis, and below the bases of the blades, measured along the y axis. This arrangement, known as "rear pivoting," reduces the likelihood of nicking due to the positive exposure of the primary blade, especially during clean up strokes, and spreads blade wear relatively evenly between the blades. The rear pivoting arrangement also helps to prevent nicking by the positively exposed primary blade.

The pivot axis is also positioned below a lowermost portion of the base portions of the blades. This positioning allows the cartridge to have a small footprint.

The housing 12 can be made of any suitable material including, for example, amorphous blends of polyphenylene ether and polystyrene, e.g., polymers sold under the tradename NORYL resins, acrylonitrile butadiene styrene (ABS), polystyrene, polyethylene terephthalate (PET or PETE), high density (HD) PETE, thermoplastic polymer, polypropylene, oriented polypropylene, polyurethane, polyvinyl chloride (PVC), polytetrafluoroethylene (PTFE), polyester, high-gloss polyester, nylon, or any combination thereof. The cap 14 is preferably formed of the same material as the housing.

The clips can be made of metals (preferably Aluminum, aluminum alloys) or other malleable material.

The guard, including the elastomeric portion of the composite guard, may be made of any suitable materials, e.g., as described in U.S. Application No. 61/983,790, filed Apr. 24, 2014.

A number of embodiments have been described. Nevertheless, it will be understood that various modifications may be made without departing from the spirit and scope of the disclosure.

For example, the cartridge may have more or fewer than five blades. Moreover, the exposure of the blades other than the primary blade may in some implementations be different from the progression described above.

As another example, while a composite guard bar consisting of an elastomeric guard bar and a rigid guard bar support has been described above, other types of guard bars may be used.

Moreover, while a generally rectangular cartridge is shown in the Figures, other shapes can be used, e.g., oval.

Accordingly, other embodiments are within the scope of the following claims.

What is claimed is:

1. A razor cartridge, comprising:

a frame defining a base, said frame having an opening defined in part by a composite guard having a leading guard surface and a cap having a trailing cap surface, said leading guard surface and said trailing cap surface cooperating to define a contact plane tangential thereto and extending across said opening; and at least three razor blades positioned in said opening and attached to said base, said razor blades being fixedly spaced;

wherein the cutting edge of the razor blade closest to the leading guard surface has a cutting edge exposure relative to said contact plane that is positive;

wherein the cutting edge exposures of the other razor blades relative to the contact plane become less positive from said leading guard surface to said cap; and wherein the blades are fixedly supported within the frame such that the blades do not move relative to the frame during shaving.

2. The razor cartridge of claim 1 wherein said composite guard includes an elastomeric guard bar having a skin contacting surface, and a rigid guard bar support defining said leading guard surface, wherein the rigid guard bar support is proximal to the cutting edge of the razor blade closest to the leading guard surface.

3. The razor cartridge of claim 2 wherein the skin contacting surface is higher, relative to a base of the composite guard, than an uppermost surface of the rigid guard bar support.

4. The razor cartridge of claim 3 wherein the skin contacting surface is higher by 0.1 to 0.4 mm.

5. The razor cartridge of claim 4 wherein the skin contacting surface is higher by 0.2 to 0.3 mm.

6. The razor cartridge of claim 1 wherein the cartridge has a pivot point that is closer to the trailing cap surface than to the leading guard surface.

7. The razor cartridge of claim 6 wherein the pivot point is below a lowermost portion of the blades.

8. The razor cartridge of claim 1 wherein at least two of the blades have an inter-blade span from 0.75 to 0.85 mm.

9. The razor cartridge of claim 1 wherein the distance between a leading edge of the leading guard surface and the cutting edge closest to the leading guard surface is from 0.3 to 0.75 mm.

10. The razor cartridge of claim 1 wherein the distance between a leading edge of the leading guard surface and the cutting edge closest to the leading guard surface is from 0.35 to 0.45 mm.

11. The razor cartridge of claim 1 wherein the blades are bent blades.

12. The razor cartridge of claim 1 wherein the inter-blade span between each of the blade edges is less than 0.9 mm.

13. The razor cartridge of claim 1 wherein the exposure of the razor blade closest to the leading guard surface is positive by at least 0.02 mm.

14. The razor cartridge of claim 1 wherein at least five razor blade are attached to said base.

15. The razor cartridge of claim 1 wherein at least two of the blades have an inter-blade span that is less than 0.9 mm.

16. A razor cartridge, comprising:

a frame defining a base, said frame having an opening defined in part by a guard having a leading guard surface and a cap having a trailing cap surface, said leading guard surface and said trailing cap surface cooperating to define a contact plane tangential thereto and extending across said opening; and at least three razor blades positioned in said opening and attached to said base, said razor blades being fixedly spaced;

wherein the cutting edge of the razor blade closest to the leading guard surface has a cutting edge exposure relative to said contact plane that is positive;

wherein the cutting edge exposure of the cutting edges of the other razor blades relative to said contact plane become less positive from said leading guard surface to said cap, and one or more of said other blades has a cutting edge exposure relative to the contact plane that is negative or neutral; and wherein the blades are fixedly supported within the frame such that the blades do not move relative to the frame during shaving.

17. The razor cartridge of claim 16 wherein said guard is a composite guard.

18. The razor cartridge of claim 17 wherein said composite guard includes an elastomeric guard bar having a skin contacting surface, and a rigid guard bar support defining said leading guard surface, wherein the rigid guard bar support is proximal to the cutting edge of the razor blade closest to the leading guard surface.

19. The razor cartridge of claim 16 wherein the cartridge has a pivot point that is closer to the trailing cap surface than to the leading guard surface.

20. The razor cartridge of claim 19 wherein the pivot point is below a lowermost portion of the blades.

21. The razor cartridge of claim 16 wherein at least two of the blades have an inter-blade span from 0.75 to 0.85 mm.

22. The razor cartridge of claim 16 wherein the distance between the leading guard surface and the cutting edge closest to the leading guard surface is from 0.3 to 0.75 mm.

23. The razor cartridge of claim 16 wherein the distance between a leading edge of the leading guard surface and the cutting edge closest to the leading guard surface is from 0.35 to 0.45 mm.

24. The razor cartridge of claim 16 wherein the blades are bent blades.

25. The razor cartridge of claim 16 wherein at least two of the blades have an inter-blade span that is less than 0.9 mm.

* * * * *